Sept. 17, 1963   R. G. KANTAR   3,103,800
GEAR ASSEMBLY
Filed April 19, 1961

INVENTOR.
Raymond G. Kantar
BY
W. E. Finken
His Attorney

United States Patent Office 3,103,800
Patented Sept. 17, 1963

3,103,800
GEAR ASSEMBLY
Raymond G. Kantar, Rochester, N.Y., assignor to General Motors Corporation, Detroit, Mich., a corporation of Delaware
Filed Apr. 19, 1961, Ser. No. 104,180
2 Claims. (Cl. 64—27)

This invention pertains to a gear assembly, and particularly to a gear assembly including driving and driven gears capable of limited torsional deflection relative to each other.

Heretofore, a resilient coupling has been used in electric motor driven window lifts to absorb the shock of impact due to stalling of the electric motor when the window engages stops in the fully raised or fully lowered positions, or encounters some other obstacle in an intermediate position. A gear assembly including a highly satisfactory resilient coupling of the type suitable for electric motor driven window lifts is disclosed in the Andrews Patent 2,785,580.

The present invention relates to a gear assembly embodying an improved coupling of reduced cost. Accordingly, among my objects are the provision of a gear assembly including driving and driven gears with a resilient coupling therebetween; the further provision of a gear assembly comprising mating parts, at least one of which is composed of a resilient plastic material capable of limited torsional deflection; and the still further provision of a gear assembly embodying a resilient coupling comprising a driving gear having a plurality of circumferentially spaced radially extending tapering slots and a mating coupling attached to the driven gear having a plurality of circumferentially spaced radially extending freely flexible spokes, or vanes, in nested relation within the slots in the driving gear.

The aforementioned and other objects are accomplished in the present invention by forming the coupling member from a suitable resilient plastic such as nylon. Specifically, the gear assembly includes a metal shaft having a worm gear journalled thereon, opposite ends of the shaft being journalled in a housing. The worm gear is conveniently composed of nylon and includes an integral annular skirt portion having a plurality of circumferentially spaced tapering slots therein. A resilient plastic coupling member having a like number of flexible spokes, or vanes, is rigidly attached to the shaft with the spokes in nesting relation within the slots of the annular skirt on the gear. A driven pinion gear is drivingly connected to the shaft, motion being transmitted between the driving and driven gears through the spoked coupling member.

When rotation of the pinion is arrested, due to the window engaging a stop or other obstacle, continued rotation of the driving gear will cause deflection of the spokes on the coupling member. As the spokes deflect, their points of contact with the driving gear move radially inward thus decreasing the effective length of the spokes and the rate of deflection thereof. In this manner the coupling member provides the requisite torsional deflection between the driving and driven gears, and due to the fact that the coupling member is composed of a resilient material it recovers its original shape when the deforming force is relieved. In order to prevent fracture in the spokes, the spokes are tapered from their tips to their roots so as to have their greatest cross-sectional area at their root ends which are subjected to the greatest shear forces.

Further objects and advantages of the present invention will be apparent from the following description, reference being had to the accompanying drawing, wherein a preferred form of the present invention is clearly shown.

Figure 1:
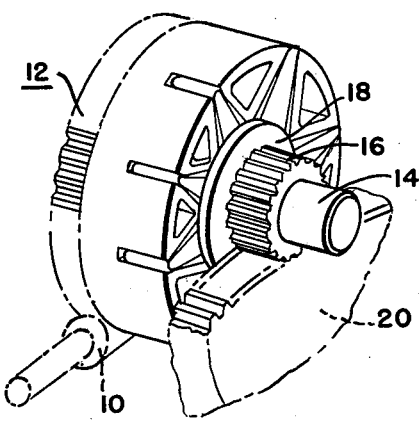
FIGURE 1 is an isometric view of the gear assembly constructed according to this invention with the driving worm and driven sector gear shown in phantom.

With particular reference to FIGURE 1, the gear assembly is particularly useful in a window lift mechanism wherein a reversible electric motor is drivingly connected by means of a worm 10 to a worm gear 12 constituting the driving gear of the gear assembly. The worm gear 12 is journalled on a shaft 14 to which a driven gear, in the form of a pinion 16, is drivingly connected, rotation of the driving gear 12 being imparted to the pinion gear 16 through a coupling member 18. The pinion gear 16 meshes with a sector gear 20 constituting part of the window regulating mechanism.

Figures 2, 3:
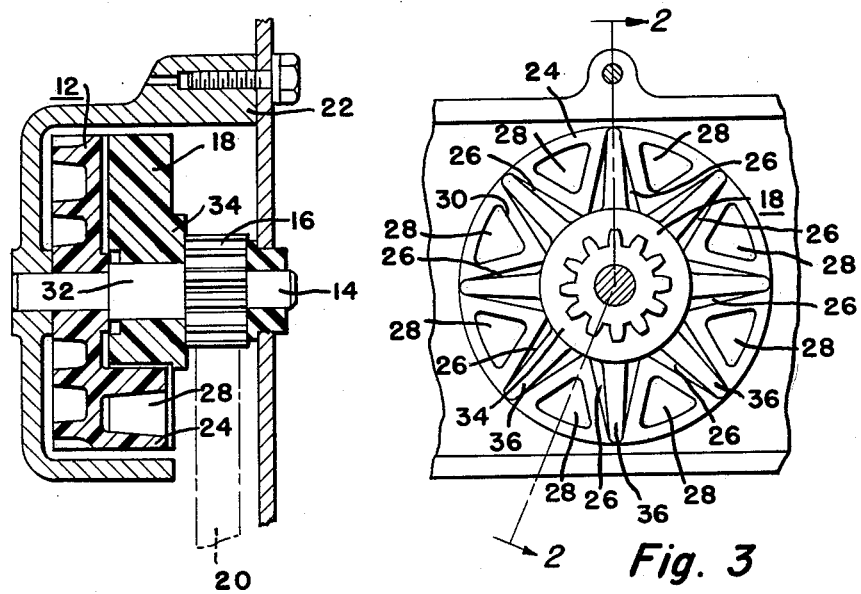
FIGURE 2 is a sectional view taken along line 2—2 of FIGURE 3.
FIGURE 3 is a fragmentary view of the gear assembly shown partly in section and partly in elevation.

As seen particularly in FIGURES 2 and 3, the shaft 14 has its opposite ends journalled in a gear housing 22. The driving worm gear 12 is journalled adjacent one end of the shaft 14 and includes an integral annular skirt 24 a plurality of circumferentially spaced radially extending notches 26 therein and a plurality of circumferentially spaced substantially triangular openings 28. The driving gear 12 may be composed of a suitable resilient plastic, such as nylon, although this is not essential. It is pointed out that the radial slots 26 taper from their roots to their tips so as to form webs 30 of substantially uniform thickness between the slots 26 and the triangular openings 28.

The shaft 14 has an intermediate portion 32 substantially square in cross-section, and the coupling member 18 is formed with a central opening in its hub of like configuration. The coupling member 18 includes a hub 34 having a plurality of radially extending vanes, or spokes, 36 of tapering thickness from their roots to their tips. As shown, the coupling member is composed of a resilient plastic such as nylon. The tips of the spokes are adapted to be snugly received by the outer ends of the slots 26 in the skirt of the gear 12 when the coupling is nested within the gear as shown in the drawing. The pinion gear 16 is suitably drivingly connected to the shaft 14, such as by press fitting the same on a knurled portion of the shaft. Accordingly, it will be appreciated that the coupling member 18 and the pinion gear 16 are connected for rotation in unison with the shaft 14. However, the driving gear 12 is free to rotate relative to the shaft 14 as well as to move throughout a limited angular distance relative to the coupling member 18 by deflecting the spokes 36.

When rotation of the coupling member 18, the shaft 14 and the pinion gear 16 is arrested for any reason, continued rotation of the driving gear 12 will result in deflection of the spokes 36. As the spokes 36 deflect, their points of contact with the slots 26 in the annular skirt of the gear 12 move radially inward thereby decreasing the effective length of the spokes and decreasing the rate that the spokes are required to deflect for a given angular movement of the worm gear 12 relative to the coupling member 18. In a specific window lift installation, a relative torsional deflection between the coupling 18 and the gear 12 throughout an angle of approximately 15° can readily be accomplished with the gear and coupling assembly of this invention. Under these relative deflections the root portions of the spokes 36 are subjected to shear forces of considerable magnitude, and it is for this reason that the root portions of the spokes are of greater cross-sectional area than the tip portions.

While the embodiment of the invention as herein disclosed constitutes a preferred form, it is to be understood that other forms might be adopted.

What is claimed is as follows:

1. A coupling for interconnecting coaxial driving and driven members comprising an annular skirt on one of said members having a plurality of equiangular spaced tapered slots, said slots being spaced apart by triangular web formations having walls of substantially uniform thickness, and a resilient plastic element operatively connected to the other of said members and having a plurality of spokes in nesting relation within the slots of said annular skirt, the spokes of said element being deflectable under abnormal loads to permit limited torsional deflection between the driving and driven members.

2. A coupling for interconnecting coaxial driving and driven members comprising an annular skirt on one of said members having a plurality of equiangular spaced tapered slots, said slots being spaced apart by substantially triangular web formations having walls of substantially uniform thickness, and a resilient plastic element operatively connected to the other of said members having a plurality of tapered spokes in nesting relation within the tapered slots of said skirt, the tips of said spokes being snugly received in the tapered portions of the slots of said skirt and being deflectable under abnormal loads to permit limited torsional deflection between said driving and driven members.

References Cited in the file of this patent

UNITED STATES PATENTS

| | | |
|---|---|---|
| 1,235,734 | Stange | Aug. 7, 1917 |
| 1,854,941 | Kiel | Apr. 19, 1932 |
| 2,588,158 | Pierce | Mar. 4, 1952 |
| 2,629,991 | Guy | Mar. 3, 1953 |
| 2,699,656 | Anderson et al. | Jan. 18, 1955 |
| 2,785,580 | Andrews | Mar. 19, 1957 |
| 2,857,777 | Porter | Oct. 28, 1958 |
| 2,914,959 | Fawick | Dec. 1, 1959 |
| 2,918,809 | Miller | Dec. 29, 1959 |
| 2,971,356 | Reuter et al. | Feb. 14, 1961 |
| 2,976,741 | Martin | Mar. 28, 1961 |
| 2,992,715 | Blachly | July 18, 1961 |